United States Patent [19]

Cross et al.

[11] 4,167,328

[45] Sep. 11, 1979

[54] PASSIVE OPTICAL RANGE SIMULATOR DEVICE

[75] Inventors: Michael A. Cross, Severna Park; Fred S. Hurt, Ellicott City, both of Md.

[73] Assignee: Westinghouse Electric Corp., Pittsburgh, Pa.

[21] Appl. No.: 837,067

[22] Filed: Sep. 28, 1977

[51] Int. Cl.$^2$ .................. G01C 3/08; G01J 1/02
[52] U.S. Cl. ..................... 356/5; 350/96.11; 350/96.18; 356/243
[58] Field of Search ........... 356/5, 243; 350/96.11, 350/96.18

[56] References Cited

U.S. PATENT DOCUMENTS

| 3,981,592 | 9/1976 | Williams | 356/5 |
| 4,068,952 | 1/1978 | Erbert et al. | 356/5 |
| 4,121,890 | 10/1978 | Braun | 356/5 |

Primary Examiner—S. C. Buczinski
Attorney, Agent, or Firm—D. F. Straitiff

[57] ABSTRACT

An improved passive optical range simulator device used to test the ranging function of the optical radar ranger system by input to a coil of optical fiber having a mirror at its inner terminus that permits such coil to act as an optical delay medium. Improvement resides in inclusion of a partial mirror at the input end of the optical fiber coil to present multiple "target echo" reflections of the laser pulses back to the optical radar ranger system undergoing test.

4 Claims, 1 Drawing Figure

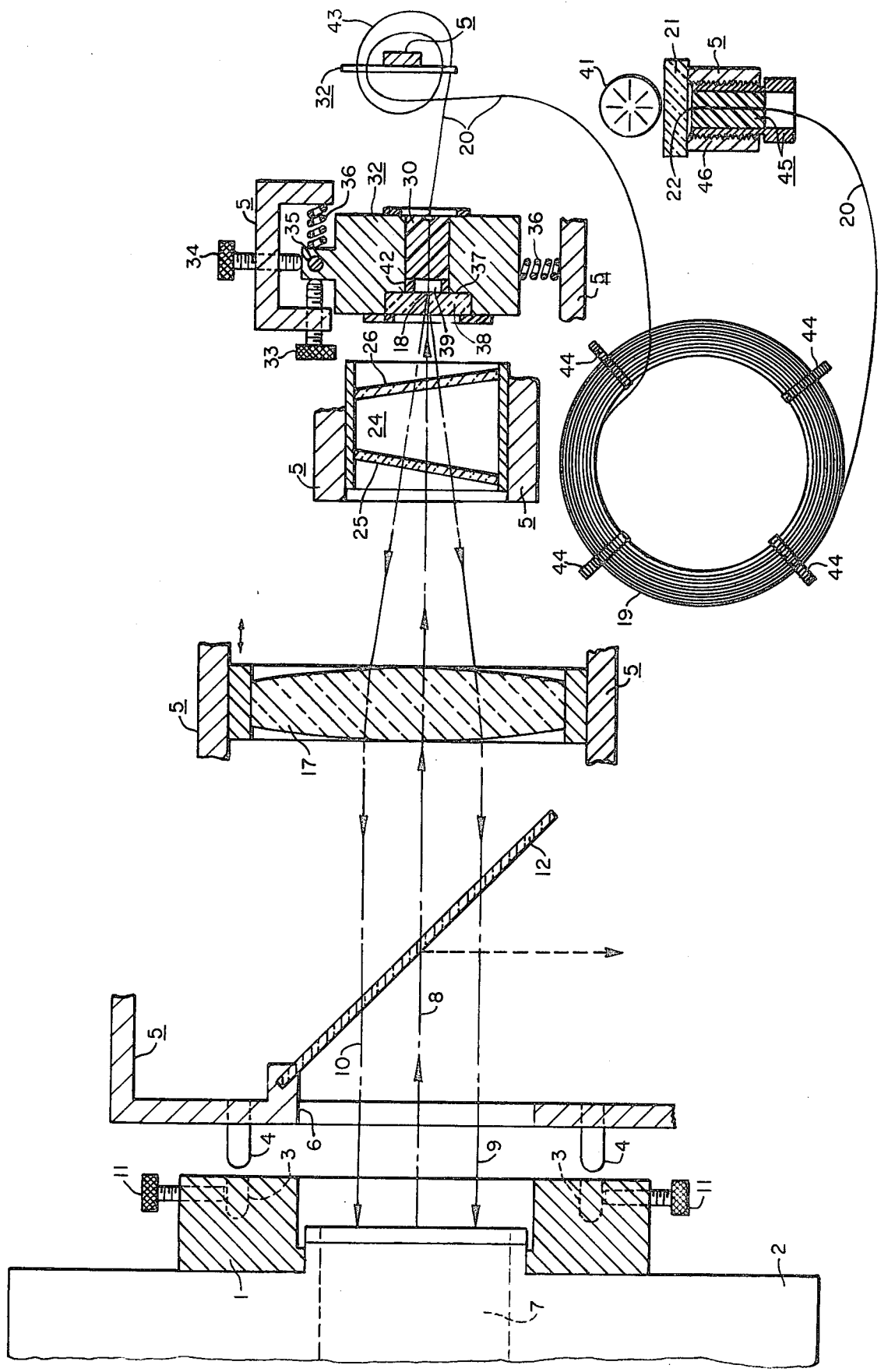

PASSIVE OPTICAL RANGE SIMULATOR DEVICE

RELATED APPLICATIONS

Copending patent applications Ser. No. 775,061 and 800,119, filed respectively Mar. 7, 1977 and May 24, 1977, assigned to the same assignee as the present application are related to the present application. These are identified cases 47,247 and 47,221 in assignee's files.

BACKGROUND OF THE INVENTION

1. Field of the Invention

An optical range simulator device.

2. Description of the Prior Art

The passive optical range simulator described in application Ser. No. 775,061 uses a fiber optic delay line to furnish a single target echo capable of confirming the range calibration and boresight accuracy of an optical radar ranging system. Range calibration of the simulator may be accomplished by any of the following methods: measurement of fiber delay line length and conversion of this to effective optical length using known refractive index of fiber; use of an optical radar ranging system (known to be good) to transfer calibration from surveyed targets on an outdoor range to the simulator being calibrated; or, timing optical pulses propagating on a one-way path through the fiber optical delay line to determine its effective length.

In practice, none of these methods is simple or straightforward, and most simulators have been calibrated by the second method. A target echo from a single known range is sufficient to set or confirm the zero-range adjustment of an optical ranging system under test, provided that the system's range scaling is accurate and behaves linearly. Under these conditions, even though the system has been calibrated only at a single range point, the calibration will be valid at other ranges. In many cases, there is a lack of confidence in system range linearity even though range scale factor may have been set initially by independent electrical measurements.

From the foregoing, it will be apparent that it is desirable to simulate several target echoes separated in range so as to cover the range window of interest. A minimum of three such target echoes is required to distinguish between the effects of zero-set and range-scaling adjustments, and to assess the fundamental ability of a system to time the ranging interval accurately. Thus, zero-range of the system under test may be set or confirmed on any one target echo, range-scaling adjusted (if necessary) to exhibit correct range readout on a second, and proper range readout independently confirmed by means of a third target echo.

There also is a need for multiple target echoes to exercise a ranging system's dynamic response to a multiplicity of targets and change in range of a most distant target.

It is desirable that the multiple target simulator substantially confirm its own calibration in order to avoid the high cost in terms of time and inconvenience associated with the three "independent" calibration techniques identified above. In furnishing the above desired properties, it is important that the ability to confirm boresight accuracy be retained.

SUMMARY OF THE INVENTION

The present invention accommodates the foregoing objectives by the provision of an optical range simulator having an optical fiber delay line coil within which multiple reflections are induced by reflecting surfaces at each end of such coil. The entrance one of these surfaces is partially reflecting and partially transmitting at the wavelength of interest so that a fraction of the energy stored in the coil may be extracted through this partially reflective surface to furnish a series of "target echoes" equally spaced in range at multiples of the fiber delay line optical length. The partial transmission property of this surface does not hinder the coupling of optical pulses into the coil from the transmitter of the ranging system under test. In the situations requiring maximum echo amplitudes, a total reflector is necessary at the other end of the delay line length. As in the referenced simulator of Ser. No. 775,061, all collimated and parallel beams intercepted by the focussing element find their common focus at a point in a common plane which is adjusted to coincide with the fiber entrance end. The reflecting surface of the partial entrance reflector is also coincident with such plane and in physical contact with the fiber end under controlled pressure in accord with teachings in Ser. No. 800,119. The addition of the partial entrance reflector to achieve multiple reflections does not affect the above-mentioned common focus properties, hence the boresight confirmation feature is preserved. Both reflectors are of dielectric layer construction to accommodate the high energy densities produced by the optical transmitter, and to exhibit the desired properties at the wavelength of interest while retaining useful transparency at visible wavelengths to retain the feature of transmitting visible light from an external source through the fiber to illuminate the fiber entrance aperture for ease of positioning in the focal plane as set forth in Ser. No. 775,061.

Change in the number of target echo reflections obtained can be arrived at either by change of optical path attenuation exterior to the reflecting delay line by means of an adjustable attenuator or by controllable separation of the fiber end and the terminal reflector.

Of these methods, the first one is preferred when it is required to change attenuation in discrete calibrated steps, while the second one lends itself to continuous attenuation adjustment. Either technique will produce fewer system-recognizable target echoes with increasing path attenuation. The number of target echoes that can be simulated is a function of the usable dynamic range of the simulator defined as a residue of a total system dynamic range remaining after all sources of loss have been subtracted. The usable dynamic range is usually input power limited, because of the need to avoid damage to optical surfaces such as the entrance reflector, and the attenuation introduced into the optical path to limit the focussed power density constitutes the major fraction of the above loss. Thus, a typical system under test may exhibit a dynamic range in excess of 130db of which perhaps 50db is available to the simulator in usable form. A theoretical model has been developed which predicts the usable dynamic range required for visibility of the nth target echo when corrected for the effects of pulse dispersion. For a 0.5 Km delay line, (loss 2.5db per Km at wavelength of interest) used with a 63% reflectivity entrance mirror and total terminal mirror, the predictions are as follows:

| Echo Order n | Usable Dynamic Range Requirements db |
| --- | --- |
| 1 | 16.5 |
| 2 | 24.2 |
| 3 | 31.1 |
| 4 | 37.7 |
| 5 | 44.0 |

This tabulation shows that 50db of usable dynamic range should produce five target echoes tapering in amplitude relative to the first echo (n=1) as indicated by the db differences. On this basis, five target echoes can simulate ranges out to approximately 12,000 feet in air using a comparatively short (hence less expensive) fiber optical delay line coil, and confirm range linearity at five equispaced ranges in between.

The equispaced target echoes might also be used to confirm the calibration of both fiber delay line length and system ranging if the system under test embodies an accurate range scale. The accuracy criterion is met, if: a precision time or frequency source furnishes the reference timing intervals; the range interval timing is accomplished in a linear manner; and, the correct range readout scale factor has been pre-set by means of electrical measurements.

Good range-interval-timing-linearity is indicated by equality of target-echo spacing, and this is not influenced by scale factor or zero-set errors, i.e., the "apparent" range of each echo is sufficient to determine equality of spacing. Under these conditions, the range readout corresponding to echo spacing is a measure of the effective length of the fiber optic coil delay line, i.e., the delay line is calibrated to within range scale accuracy. Small random departures from exact equality of spacing can occur in practice due to corresponding departures from range interval timing linearity. The effect of these errors may be minimized by calculation of average spacing as being equal to the range separation of first and nth target echoes divided by n−1; the accuracy improving with increasing n. Once the optical fiber coil delay line length has been determined, the accuracy of zero-range setting of the system under test may be established. It is evident that any significant departure from an exact multiple relationship between the first echo range and the ranges of subsequent echoes indicates an error in the zero-range setting. The magnitude and direction of this error may be determined from the following expression which gives the true range of the nth echo:

$$R_n^t = R_n + \left[ \frac{R_n - nR_1}{n - 1} \right]$$

where n is an integer > 1
$R_n^t$ = true range of nth echo
$R_n$ = apparent range of nth echo.
$R_1$ = apparent range of first echo.
The quantity in parentheses furnishes the magnitude and sign of the zero-set error, and this information may be used to correct the zero-range setting of the system under test. When this has been done, the indicated and the calculated (true) ranges will coincide, and both the system under test and the optical fiber coil delay line are calibrated. It is seen that the ability to furnish multiple target echoes is vital to this calibration process even though the basic calibration reference is the precision time or frequency source in the system under test.

Due to the additional distance propagated within the fiber, each target echo exhibits more dispersion (pulse stretching) than its precursor. By selection of a specific target echo, this behavior may be exploited in order to simulate the degree of pulse stretching exhibited by optical radar echoes when ranging to real targets at oblique angles. In the simulator of Ser. No. 775,061, the simulation of pulse stretching requires selection of suitable optical fiber properties, hence a change in fiber optic coils. It is evident that target echo selection in the present invention is accomplished with relative simplicity. The present invention is also capable of simulating a wider range of dispersion.

When the previous simulator of Ser. No. 775,061 uses a 0.5 Km optical fiber coil delay line, its single target echo normally arrives at the optical receiver during the latter's recovery from "main bang" desensitization with the result that the receiver's threshold sensitivity is degraded. It follows that such simulator cannot be used to determine round-trip system performance unless the optical fiber coil delay line length is increased to allow full receiver recovery. By contrast, the present multiple reflection simulator using a 0.5 Km optical fiber coil delay line yields several target echoes in the region of full threshold sensitivity.

Round-trip system performance of a system under test (or total system dynamic range) is a direct function of transmitter output power and receiver sensitivity. As for the simulator of Ser. No. 775,061, the total value of attenuation in the optical path may be used as a measure of this dynamic range. Thus with a given value of optical attenuation in the path, the visibility of the nth target echo may be used as a system acceptance criterion. If attenuation is introduced in calibrated increments by means of the input attenuator, the dynamic range separation of the target echoes may be determined. This measurement provides a self-test feature in the multiple reflection simulator of the present invention because small dynamic range separation of target echoes is indicative of minimal optical loss within the fiber optical coil delay line. Conversely, large intra-coil losses absorb comparable blocks of dynamic range per echo, rapidly consuming the usable dynamic range and yielding a reduced number of target echoes. The number of target echoes visible cannot be used as the sole simulator performance criterion because this is dependent also upon the available total system dynamic range. The dynamic range separation of target echoes is independent of the system dynamic range and is a direct function of fiber optical coil delay line quality; it therefore offers a reliable and readily measured performance criterion and self test feature. When first commissioned, a multiple reflection simulator may be employed with a ranging system whose total dynamic range is known, omitting any adjustment of fixed attenuation in the optical path to achieve specific echo visibility. Dynamic range separation of the target echoes may then be measured, as previously described, and checked against both theoretical predictions and the number of target echoes expected within the residual (usable) dynamic range. Good correlation indicates proper simulator functioning, and the measured separations serve as benchmarks to which all future measurements on this simulator may be referenced.

Special attention to design is required in the multiple reflection simulator if intra-coil losses are to be minimized in order to achieve the maximum number of target echoes within the available usable dynamic range. Thus, a maximum echo yield is obtained when:

The partial reflector at the fiber entrance is selected for a transmission/reflection ratio that enhances the higher order echoes at the expense of the lower order ones;

The fiber optic waveguide used in the coil exhibits a minimum loss at the wavelength of interest, and is stored in a stress-free manner to preserve such minimum loss; and Fiber entrance/exit, and reflection losses are minimized by careful attention to fiber termination and surface preparation coupled with fiber-reflector interface design.

The multiple reflection simulator of the present invention incorporates all of the above features, and the manner in which the last feature is accomplished is fully detailed in the related patent disclosure Ser. No. 800,119. The ability to accommodate high optical power densities is inherent in the design of the present terminator structure, with the result that its incorporation in the simulator permits the use of much higher incident energies than were allowable for the previous simulator of Ser. No. 775,061. As was explained earlier, the usable dynamic range is input power limited and, it follows that the ability to accept more energy increases this dynamic range and the associated maximum echo yield. It should be recalled that the increase in echo yield via this mechanism is entirely independent of that achieved by the reduction of intra-coil losses. The success of a practical multiple reflection simulator requires that both improvement mechanisms be exploited in the pursuit of maximum echo yield. This is true because there are limits beyond which echo yield cannot be improved by sheer application of energy. The firt barrier is the non-linear behavior of the fiber at high energies (stimulated Raman scattering), followed by optical damage at critical surfaces.

This invention retains all important features of the simulator of Ser. No. 775,061 without compromise, and is an improvement thereof in that it provides the following additional capabilities and features:

It is capable of furnishing a plurality of target echoes through a multiple reflection process within the fiber optic coil delay line, this being induced by the addition of a planar partially reflecting surface coincident with the fiber entrance to a coil terminated in a planar reflector. The delay associated with each target echo exhibits the stability and precision inherent in the use of a length of optical fiber;

Furnishes means to control the number of target echoes obtained as described hereinbefore, and secures the simulation of change in range of the most distant target;

Provides cost saving by employing a relatively short fiber optic coil delay line to simulate ranges of many times its own length and allow full recovery of optical receiver threshold sensitivity;

When operated in conjunction with a ranging system embodying an accurate range scale, is able to calibrate its own fiber optic coil delay line length and subsequently the ranging function of all systems under test. This technique avoids the need for a separate procedure to calibrate fiber optic coil delay line length, and provides an independent check of system range linearity;

Simulates a range of values of real target pulse stretching by a selection of the appropriate target echo;

Embodies the self-test feature in the form of a measurement of target echo dynamic range separation. Separation values furnish a performance criterion against which simulator behavior may be checked during its lifetime;

Furnishes a maximum number of target echoes within the available dynamic range through the use of techniques which minimize intra-coil loss; and, Furnishes a maximum number of target echoes through the use of techniques which increase the available dynamic range

BRIEF DESCRIPTION OF THE DRAWING

The single FIGURE is a schematic representation, partly in outline and partly in section, of a preferred embodiment the improved passive optical range simulator device of the present invention, as presently constructed.

DESCRIPTION OF THE PREFERRED EMBODIMENT

Where the features of the present invention coincide with the general features of the previous passive optical range simulator device of Ser. No. 775,061, the reference characters shown herein are the same. Briefly, such previous simulator device comprises an adapter member 1 that is contoured to mate with a complementary portion of an optical radar ranger system 2 undergoing test. The adapter 1 is provided with openings 3 to accept locating pins 4 projecting from a forward portion of the housing 5 of the range simulator device. Construction of member 1 is such than when in use, a test input aperture 6 for the range simulator device coincides and/or is aligned with the working aperture 7 of the ranger system undergoing test. From the aperture 7 of the optical radar ranger system undergoing test, pulses of optical laser energy will leave along a boresight axis 8 and will return along a parallel axis 9 or 10 for reentry into the system aperture 7. The other of such parallel axes 9 or 10 may represent a path for input of optical information to a television camera (not shown), for example. Attachment screws 11 affiliated with the adapter member 1 provide for locking the locating pins 4 in the openings 3 when positioned therein.

All laser pulse paths to and from the system 2 undergoing test travel along the axes 8, 9, and 10 are subjected to primary attenuation by tilted-glass attenuator 12, inclined at 45°, for example, to deflect any first surface reflection donwardly into a radiation absorber (not shown). This primary attenuator, at the input of the simulator device insures that such device looks like "free space" to the system 2 undergoing test, thus minimizing "main bang" reflected energy which otherwise tends to overload the return input to such system and possible damage to sensitive components therein.

All optical pulses along the axes 8, 9, and 10 pass through a focussing lens 17, which may be such as an F/2.5, 12 inch focal-length Aero-Ektar lens which transforms such parallel paths to and from the system 2 into corresponding focussed paths entering and leaving the entrance on end 18 of a coil 19—including length of optical fiber 20 having a total mirror 21 presented to its opposite end 22.

An adjustable attenuator assembly 24 is interposed in the optical path between the focussing lens 17 and the fiber end 18. The assembly, by way of example, may consist of a pair of oppositely-tilted glass attenuator plates 25 and 26 through which the focussed beams pass en route to and from fiber end 18. The tilting prevents first surface reflections from reaching the system 2 undergoing test. The directions of tilt are designed to be self-compensating for zero boresight axis displacement. The adjustment provided by the assembly is obtained by virtue of removability and replacement with similar attenuator assemblies of different absorption values.

The fiber end 18 or entrance face is affiliated with a terminator 30 carried in a translation member 32 affiliated with adjusting screws 33, 34, and 35, for example, to provide for fiber end position adjustment and three mutually perpendicular directions, X, Y, and Z. Compression springs 36 interposed between the housing 5 and the member 32 assure that such member will follow position adjustment of the screws. Guide means for member 32 has not been shown. The X-Y axis adjustments allow the fiber end 18 to be positioned for coincidence with the common focal point of all beams along axis 8, 9, and 10 in the focal plane, and the Z axis adjustment permits fine focus.

Preferably, the fiber entrance end 18 is arranged as set forth in detail in patent application Ser. No. 800,119 to be in direct optical coupling with an interface surface 37 of an input window 38 mounted on the translation member 32. An adjustable control contact pressure is central to the practical realization of the direct optical interface, and is made possible by virtue of proper preparation of the fiber end surface and by use of a commercially available optical fiber that has a buffer or sheathing encasement that floats free of the fiber itself and has resilient property. Fiber end preparation is by cleaving, a currently-known technique usually involving scribing and fracturing under curvature and tension. The sheathing (not shown) on the outer surface of the fiber section passing through the terminator 30 is secured in place therein by a suitable bonding (not shown). The bare fiber end slidably disposed within such sheathing, in accord with the aforementioned application Ser. No. 800,119, passes through an annular chamber 39 disposed between the end face 37 and the end of the terminator 30 and defined by an annular washer member 40 disposed in the bore in which the terminator member 30 is mounted. Control of the contact pressure exerted by the end of the bare section of fiber within the chamber 39 is controlled by a several-turn loop section 43 of the floating-buffered optical fiber 20 wrapped around a slotted support member formed as part of or otherwise attached to the translation member 32 in order to avoid undue influence by adjustment movement thereof.

The coil 19—including length of optical fiber 20 is typically one-half to one kilometer in length and preferably is wound somewhat loosely retained together by straps 44 to minimize fiber stress. Typically, such coil might have dimensions such as seven inches outer diameter, five and one-half inches inner diameter and a thickness of one-half of an inch. This storage structure avoids all winding tension and minimizes storage stress, thus preserving minimum fiber loss. The fiber itself, as has been employed in at least one working embodiment, can be of the low-loss step-index type as furnished by Corning Glass Works, for example, typically exhibiting a loss in the order of 2.5 db per Km at 1064 nanometer wavelength. Core and cladding diameters were 85 and 125 microns, respectively. A numerical aperture might fall in the range of 0.14 to 0.18 and pulse dispersion rates of 10 nanoseconds per kilometer can be typical. The fiber is mechanically protected throughout its length by an elastic urethane "buffer" coating having a nominal thickness of 0.005 inch, which results in an overall fiber diameter of 0.015 inch.

The inner polished end 22 of the fiber is mounted in a terminator and disposed within a suitable portion of the casing 5 and held perpendicular to and disposed a short distance away from a total mirror 21 having a first surface reflectivity of about 99.9% at the laser wavelength of interest coupled with high transmissivity at visible wavelengths. This is the aspect that allows for the reflection of laser transmitter pulses with small loss, while permitting light to be coupled into the fiber from the source of visible light 41 directly behind the mirror. As heretofore, this permits light coupled into the fiber from the source 41 to be viewed on the television monitor (not shown) of the system undergoing test and facilitates positioning on the boresight axis 8 and subsequent fine focus adjustment.

In accord with the prime feature of the present invention, the surface 37 of the window 38 with which the entrance end 18 of the fiber optic line 20 is affiliated is made partially reflective by provision of a dielectric layer on such inner surface, while such entrance window is anti-reflection coated on its exterior surface. The direct physical contact between the partially reflective surface 37 and the fiber end provides a low loss junction therebetween. Introduction of laser pulses from the system 2 undergoing test to the fiber end at the partially reflective surface 37 results in transmission of such pulses through the optical fiber 20 including its coil 19 to the total reflector 21 at its terminal end 22 and back to the fiber entrance at the partial mirror 37. Each laser pulse will bounce back and forth between the partial mirror 37 and the total mirror 21 via the coil 19 a number of times. Each time the reflection appears at the partial mirror 37, be it of sufficient strength, it can be observed by the receiver (not shown) within the system 2 along the axis 9 or 10, for example. The characteristic use of the multiple reflections is set forth in detail in the preceding section entitled "Summary of the Invention," together with numerous advantages and attributes thereof. In one working prototype of the invention, the partial mirror surface 37 has a 63% reflectivity at the laser pulse frequencies of interest. The adjustment in input attenuation as discussed in the "Summary" can be arrived at by substitution in the assembly 24, or other suitable arrangement, and the adjustment in separation between the inner end of the optical fiber 20 and the total reflector 21 can be arrived at by rotary screw-threaded adjustment in position of a fiber-end terminator assembly 45 within an internally-threaded housing socket portion 46 over the end of which such reflector 21 is mounted by securing means (not shown).

We claim:

1. An improved passive optical range simulator device comprising,
    a housing having testing aperture means for registry with working aperture means of an optical radar ranger system via which optical radar pulses leave and return,
    means for directing entering and leaving optical radar pulses to and from a common focal spot,
    a length of optical fiber including a coiled portion and having one end in registry with said focal spot,
    a total optical radar pulse reflector at the opposite end of said length of optical fiber for enabling same to act as an optical delay medium, and
    a partial optical radar pulse reflector at the aforesaid one end of said length of optical fiber for generating in such length multiple reflections of an optical radar pulse from the ranger system for observation by such system.

2. The improved passive optical range simulator device of claim 1, further comprising means for adjusting attenuation of optical radar pulses entering and leaving the aforesaid one end of said length of optical fiber.

3. The improved passive optical range simulator device of claim 1, further comprising means for adjusting separation between the aforesaid opposite end of said length of optical fiber and said total optical radar pulse reflector.

4. The improved passive optical range simulator device of claim 1, wherein the length of said optical fiber is in the order of one-half kilometer and the reflectivity of said partial reflector is in the order of sixty-three percent.

* * * * *